United States Patent

Hardy et al.

Patent Number: 6,108,351
Date of Patent: Aug. 22, 2000

[54] NON-LINEARITY ESTIMATION METHOD AND DEVICE

[75] Inventors: Patrick Hardy, Baulon; Stéphane Hergault, La Mézière, both of France

[73] Assignee: Thomson Broadcast Systems, France

[21] Appl. No.: 08/875,318
[22] PCT Filed: Nov. 7, 1996
[86] PCT No.: PCT/FR96/01755
  § 371 Date: Jul. 9, 1997
  § 102(e) Date: Jul. 9, 1997
[87] PCT Pub. No.: WO97/17773
  PCT Pub. Date: May 15, 1997

[30] Foreign Application Priority Data

Nov. 9, 1995 [FR] France .................. 95 13282

[51] Int. Cl.[7] .................. H04B 10/155
[52] U.S. Cl. .............. 370/491; 370/500; 375/285
[58] Field of Search .................. 370/490, 491, 370/500, 503, 480, 482, 488, 489; 375/285, 219, 326

[56] References Cited

U.S. PATENT DOCUMENTS 5,323,119  6/1994  Powell et al. .
5,710,653  1/1998  Nemecek et al. .................. 359/187
5,720,039  2/1998  Lieberman .................. 375/285
5,745,839  4/1998  Lieberman .................. 375/285
5,818,544  10/1998  Han .................. 375/326

FOREIGN PATENT DOCUMENTS

0407919A2  1/1991  European Pat. Off. .

OTHER PUBLICATIONS

PCT International Office Search Report.
002010054; Bertelsmeier et al– "Linearization of broadband optical transmission systems by adaptive predistortion".
Journal of Lightwave Technology Progress in Externally Modulated AM CATV Transmission Systems—vol. 11, No. 1 Jan. 1993 Nazarathy et al.

*Primary Examiner*—Dang Ton
*Assistant Examiner*—Tuan Q Ho
*Attorney, Agent, or Firm*—Joseph S. Tripoli; Ronald H. Kurdyla; Vincent E. Duffy

[57] ABSTRACT

The process is characterized in that the pilot signals (10) generated upstream of the device (11) whose non-linearity it is desired to measure pass through a known non-linear device (15) delivering intermodulation products of known characteristics and in that at least one of the known intermodulation products is harnessed in order to modulate, with the aid of synchronous detection circuits (17), at least one of the signals relating to the components of the intermodulation products of the device to be measured.

The applications pertain to the analog transmission of television signals over optical fibers.

11 Claims, 5 Drawing Sheets

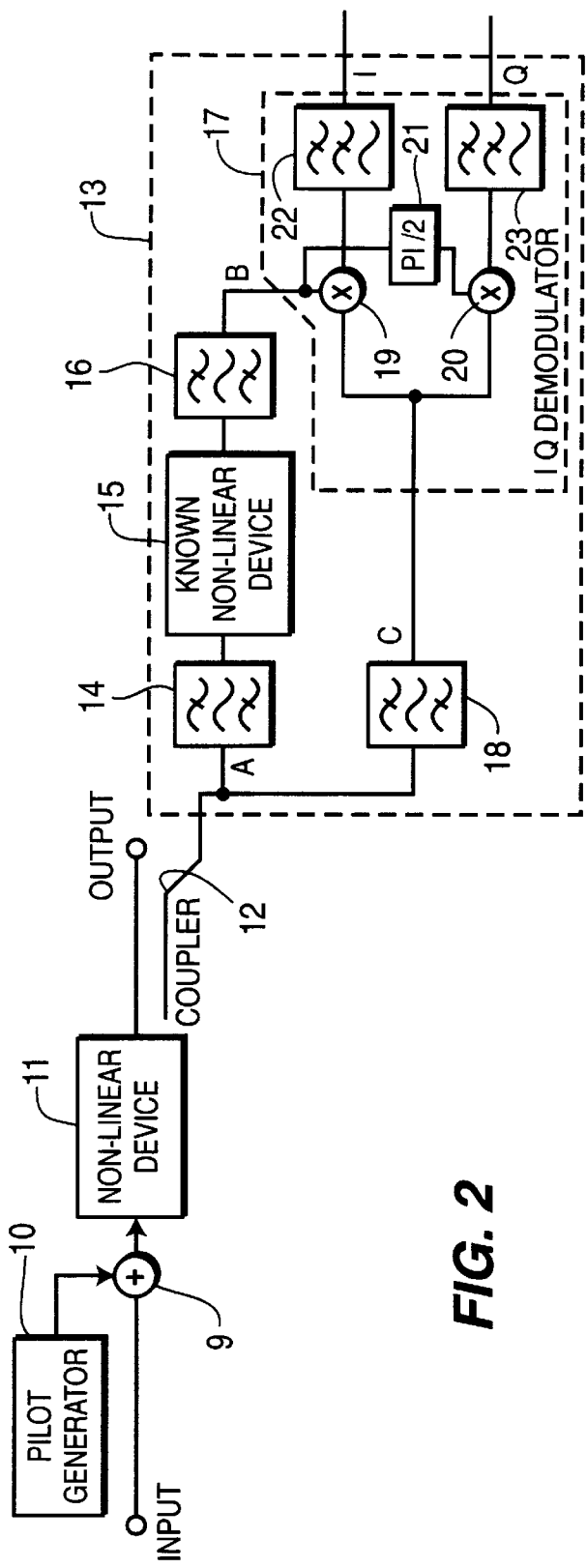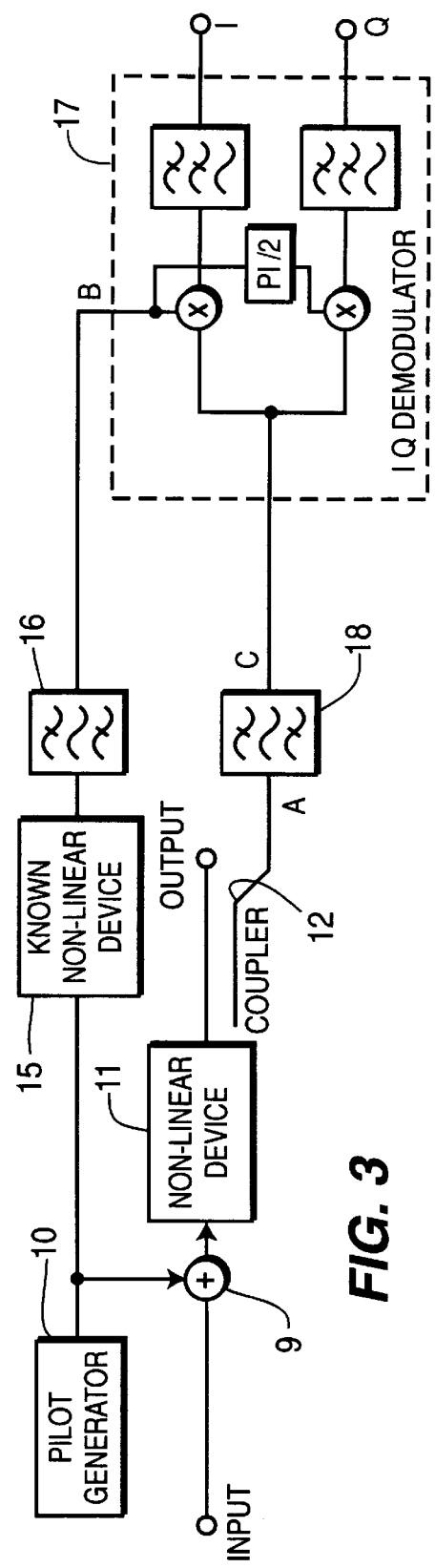
FIG. 2
FIG. 3

NON-LINEARITY ESTIMATION METHOD AND DEVICE

The invention relates to non-linear circuits and more particularly to devices for correcting linearity of such circuits.

It applies for example to the circuits for modulating an optical signal from a laser for the fibre optic transmission of signals. This modulation, carried out with the aid of an external modulator wired to the output of the laser, is a source of non-linearity.

Systems for transmitting a signal are generally sensitive to the non-linearity of the various elements of which they are composed. Although the non-linearity of these elements is imposed by the physics, it is nevertheless possible to add linearizing devices so as to improve the overall performance of the system. It is necessary in this case to have available a means of measuring the residual non-linearities of the system to be corrected so as to be able to optimize the parameters of the linearizing device. If moreover the non-linearities of the system are required to change over time, the measuring device must be incorporated into the system so as to react in real time to the linearizing devices.

A known means of estimating non-linearity consists in the use of one or more pilot signals. FIG. 1 represents such a device according to the prior art.

The pilot signal, usually sinusoidal, is generated by a pilot oscillator or generator 1. This signal is sent to a second input of an adder 2 whose first input is supplied with the signal to be transmitted or useful signal. The non-linear device in respect of which it is sought to correct the disturbing effects due to non-linearity is wired up downstream of the pilot frequency generator, for example at the output of the adder 2. A coupler 4 is wired to the output of the non-linear device so as to tap off, from its coupled output, the intermodulations created by this device. The direct output from the coupler delivers the signal to be harnessed, which will optionally be filtered so as to be rid of the previously added pilot signal. The signal tapped off from the coupled output is transmitted to the input of a path for measuring second-order intermodulation signals or of several paths for measuring intermodulation signals of successive orders, for example two paths in the diagram. Each of the paths consists of a first band-pass filter 5.1, 5.2, whose role is to select the harmonic whose frequency corresponds to the order of intermodulation of the path, followed by a detector 6.1, 6.2, which measures the amplitude or the power of the filtered signal. The detector can be a simple diode or a device which associates a resistor and a temperature measurement such as a bolometer. The output of the detector is linked to a low-pass filter 7.1, 7.2, which eliminates the spurious frequencies. The output of each of the paths (or of the measurement path in the case where it is unique) is linked to a control device 8, itself linked to the non-linear device. This control device transforms the signals received into control signals suitable for the inputs for correcting non-linearity of the non-linear device.

The devices of this type suffer from major drawbacks. They cannot provide information on the phase of the intermodulations and they are rather insensitive, in particular when the device is working in the presence of noise. They are not suitable if the levels of the intermodulation products, that is to say the non-linearities to be measured, are very low.

An improvement in this sensitivity, for devices of this type, runs up against a prohibitive cost. Thus, effective filtering of the intermodulation products would require not only the use of noise filters 5.1, 5.2 of high performance, which are therefore tricky to construct, but also of a perfectly frequency-stable pilot signal.

The purpose of the present invention is to alleviate the aforesaid drawbacks. Its subject is a process for estimating non-linearity of a device consisting in generating one or more pilot signals upstream of the device for measuring components of their intermodulation products at the output of this device, characterized in that the pilot signals pass through at least one known non-linear device delivering intermodulation products of known characteristics, and in that at least one of the known intermodulation products is harnessed in order to modulate, with the aid of synchronous detection circuits, at least one of the signals relating to the components to be measured.

It has the advantage of allowing faster correction of the non-linear device owing to the phase information. The sensitivity of the estimation device is improved and the cost is reduced owing to the use of standard filters and reduced constraints on the pilot signals.

The characteristics and advantages of the present invention will emerge better from the following description given by way of non-limiting example with reference to the appended figures in which:

FIG. 2 represents, in its basics, a device for measuring non-linearity according to the invention.

FIG. 3 represents a variant of this device.

Figures 1, 7:
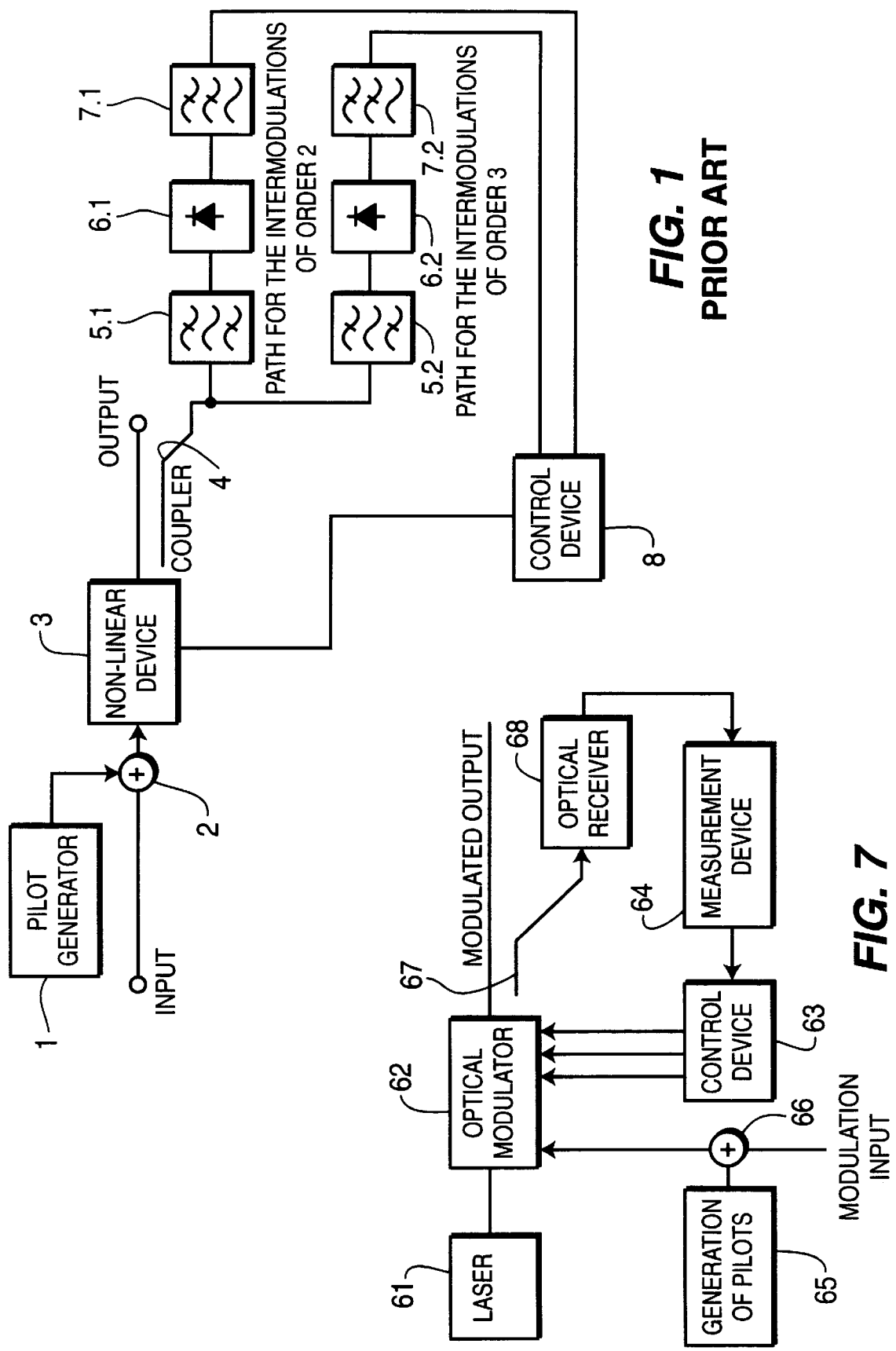
FIG. 1 represents a device for measuring non-linearity according to the prior art.
FIG. 7 represents an application of the device for measuring non-linearity.

The device according to the invention is represented in FIG. 2. It uses, like the known devices, a pilot signal injected upstream of the non-linear device to be measured. The useful signal which is required to supply the non-linear device is previously transmitted to a first input of an adder 9. The second input is, as previously described, supplied by a pilot generator 10 which generates a signal, for example sinusoidal, whose frequency lies in the pass band of the non-linear device. The output of the adder is linked to the input of the non-linear device 11 whose non-linearity it is sought to correct. The output of the non-linear device is linked to a coupler 12 whose direct path delivers the useful signal. This signal is then optionally filtered by the downstream circuits so as to eliminate the pilot signal therefrom if necessary, The coupled output is linked to a measurement device proper 13 represented as a dashed line in the diagram. This device carries out the detection of the non-linearities in a novel manner.

The signal transmitted by the coupled path supplies a first band-pass filter 14 whose role is to select the pilot signal by filtering. Its output is linked to the input of a known non-linear device 15, that is to say one whose non-linear characteristics are known, for example the coefficients of its transfer function. This device generates intermodulation signals at the same frequency as those generated by the non-linear device 11. The intermodulation signal of order 2 is extracted from the signal available at the output by virtue of a band-pass filter 16 wired to the output of the device. It is then transmitted to the modulation input of a synchronous detection circuit with two quadrature paths 17, represented dashed in the diagram.

The signal transmitted on the coupled path also supplies a second band-pass filter 18 whose role is to select by filtering the intermodulation signal which it is desired to measure, that is to say the one of order 2 originating from the non-linear device 11. The output of this filter supplies, via the signal input of the synchronous detection circuit 17, each of the two paths of this circuit described below.

The synchronous detection circuit consists of two multipliers 19 and 20, each first input of which receives the signal from the filter 18. The second input is supplied, in the case of the first multiplier 19, with the signal from the filter 16 and in the case of the second multiplier 20 with this signal phase-shifted by $\pi/2$, this signal passing through a phase-shifter circuit 21 before driving the multiplier 20. The outputs of the multipliers 19 and 20 are respectively linked to the low-pass filters 22 and 23 which have the role of filtering the single continuous component. The two corresponding outputs are the quadrature outputs I and Q of the synchronous detection circuit making it possible to measure the amplitude and phase of the sought-after intermodulation.

Synchronous detection makes it possible considerably to reduce the complexity of the filters. Thus, the band-pass filter 18 for preselecting the intermodulation need not be highly selective, its role being merely to prevent saturation of the synchronous detection circuit by the useful signals and pilot signal. Selectivity is afforded by the low-pass filters 22 and 23 placed at the output of the detectors.

Let $\omega_1$ be the angular frequency of the pilot signal.

The modulation signal on the 2nd input of the synchronous detection circuit is known since it is the 2nd harmonic of a known pilot signal with angular frequency $\omega_1$ delivered by a non-linear device with known characteristics:

$$B = A_b \cdot \cos(2\omega_1 t + \phi_b),$$

$A_b$ and $\phi_b$ being the amplitudes and phases of the 2nd harmonic generated by the known non-linear device 15.

The signal from the filter 18 has the value:

$$C = A_b \cdot \cos(2\omega_1 t + \phi_c),$$

$A_c$ and $\phi_c$ being the amplitudes and phases of the 2nd harmonic generated by the non-linear device 11.

The continuous component of the signal B×C corresponding to the output I has the value:

$$I = B \times C = \tfrac{1}{2} \cdot A_b \cdot A_c \cdot \cos(\phi_b - \phi_c).$$

That corresponding to the output Q has the value ($\pi/2$ phase shift of the signal B):

$$Q = \tfrac{1}{2} \cdot A_b \cdot A_c \cdot \sin(\phi_b - \phi_c).$$

Thus, measurement of the amplitude of the continuous component of these signals makes it possible to ascertain the phase $\phi_c$ and the amplitude $A_c$ of the intermodulation signal of order 2 originating from the non-linear device 11.

This device can obviously be extended to the measurements of higher-order intermodulation signals, the filters 16 and 18 being adapted accordingly to filter these signals.

FIG. 3 represents a variant of the device previously described. Instead of regenerating the pilot signal transmitted to the known non-linear device by tapping off part of the signal at the output of the non-linear device 11 and filtering it by way of the filter 14, the signal from the pilot generator is here transmitted directly to the known non-linear device 15.

The same numbering is enlisted for the identical elements. The pilot generator 10 is linked to the second input of the adder 9 and simultaneously to the input of the known non-linear device 15. The filter 14 is no longer required here.

Thus, in short, the known non-linear device uses the pilot signal either by tapping it off before injection into the non-linear device 11 or by regenerating it at the output of the latter by virtue of a coupler 12 and filters 14, this latter solution having the advantage of separating the measurement device from the device for injecting the pilots.

FIGS. 2 and 3 show the basic principle for measuring intermodulation products linked to the generation of a single pilot frequency, which intermodulation products correspond to the harmonics of the pilot signal.

Figure 4:
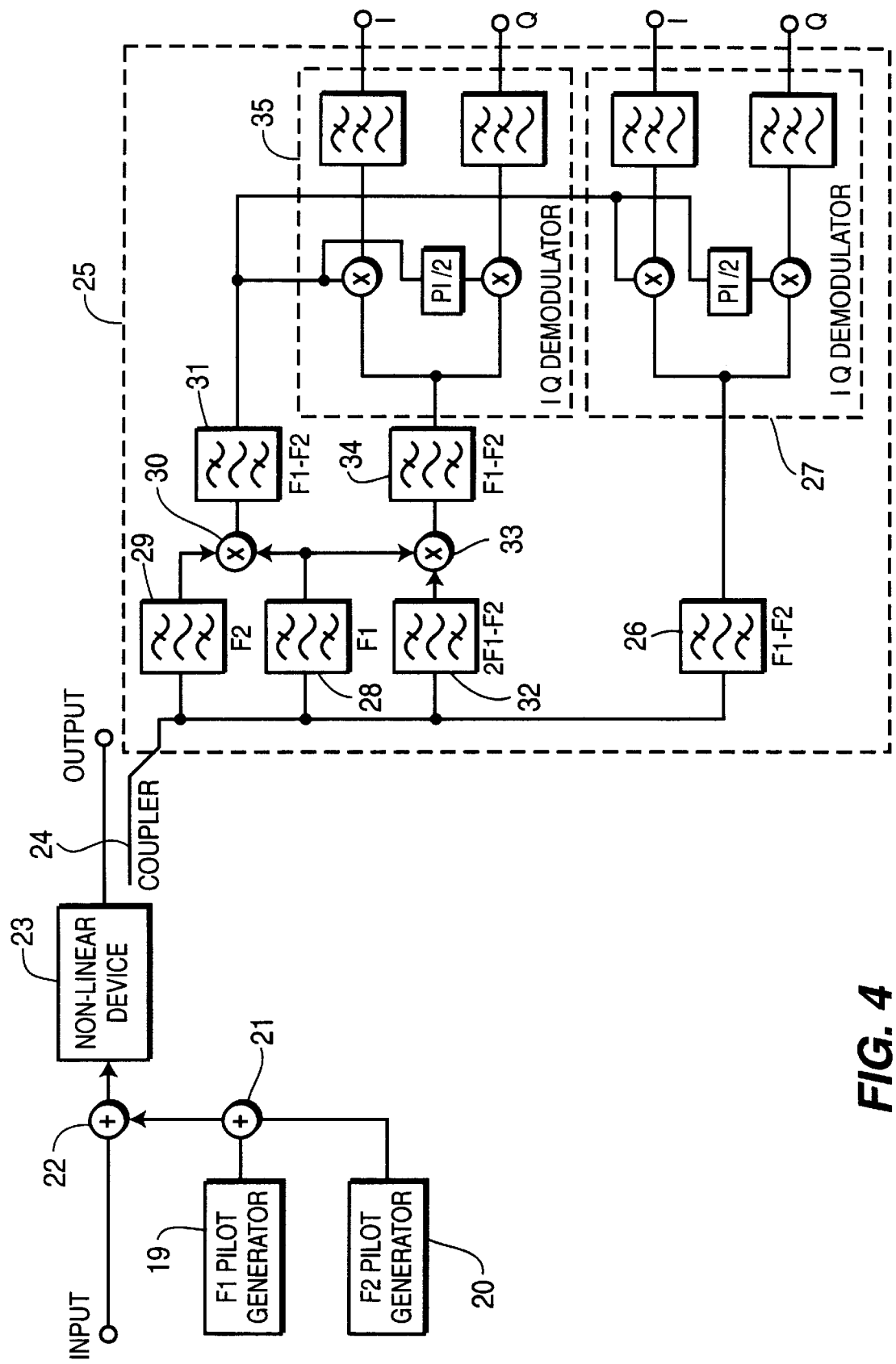
FIG. 4 represents a device for measuring non-linearity taking into account he 2nd and 3rd order intermodulation products.

However, it is equally conceivable and even more advantageous, as explained later, to measure intermodulation products of several pilot signals by generating not one but several pilot frequencies. FIG. 4 represents a device for such measurements.

A 1st pilot generator 19 transmits a signal of frequency F1 to a first input of an adder 21, a second pilot generator 20 supplies the 2nd input of this adder with a signal of frequency F2. The output from the adder is sent to a second input of a second adder 22 whose 1st input receives the useful signal. The output of the adder is linked to the input of the non-linear device 23. The output of this device drives a coupler 24 whose main path delivers the useful signal and whose coupled path delivers a part of this signal which is harnessed by the device for measuring non-linearity proper 25 represented dashed in the diagram and described below.

This device, in our example, measures the intermodulation of order two at the frequency F1–F2 and the intermodulation of order three at the frequency 2×F1–F2.

To do this, the input of the device 25 is linked to various circuits of which it is composed and firstly to a 1st band-pass filter 26 whose central frequency is F1–F2. This filter transmits the signal corresponding to this frequency to the input of a synchronous demodulation circuit 27 which is identical in structure to the circuit 17 described in FIG. 2.

The input of the device 25 is also linked to the input of a band-pass filter 28 with central frequency F1 and to the input of a band-pass filter 29 with central frequency F2. The outputs of the filters 28 and 29 are respectively linked to a 1st and to a 2nd input of an analog multiplier 30. Thus, the pilot signals F1 and F2 restored by the filters are mixed so as to generate, at the output of the multiplier 30, intermodulation products. A filter 31, wired to its output, of band-pass type and centred on the frequency F1–F2, selects the signal at this frequency so as to transmit it to the modulation input of the synchronous detection circuit 27.

The non-linear device with known characteristics is here the multiplier 30. The parameters of the signal used to detect the intermodulation of order two of frequency F1–F2 are therefore known. In other words, the amplitude and phase of the modulation signal F1–F2, knowing the characteristics of the pilot signals and of the non-linear circuits generating this signal, are known.

The path which measures the intermodulation of order three at the frequency 2×F1–F2 is embodied in an original manner, making it possible to use a synchronous detector and a modulation signal which are identical to those of the path of order 2.

The input of the device 25 is linked to the input of a band-pass filter 32 with central frequency 2F1–F2 and the output of this filter is linked to a 1st input of a second multiplier 33. The second input of the multiplier is wired to the output of the filter 28. The output of the multiplier is linked to the input of a band-pass filter whose central frequency is F1–F2. It is the signal output from this filter which supplies the signal input of a 2nd synchronous detection circuit 35 identical to the previous one. The modulation input of this circuit receives, as in the case of the circuit 27, the signal output by the filter 31.

Thus, the intermodulation at the frequency 2×F1–F2 is transposed to the frequency F1–F2 by virtue of a 2nd analog multiplier with known characteristics which uses the pilot at the frequency F1, it then being possible for this intermodulation to be processed in the same way as the intermodulation of order two. Measurement of the transposed signal F1–F2 makes it possible to ascertain the value of the component 2×F1–F2, the relation between these signals being known. This process is equivalent to synchronous detection by a signal of frequency 2×F1–F2.

The solution described in this example affords numerous advantages because it allows greater flexibility both in the choice of the pilot frequencies and of the frequencies corresponding to the various orders of the intermodulation products. In the devices previously described, the pilot frequency and the intermodulation products to be measured must lie simultaneously in the pass band of the non-linear device, this not always being achievable.

Here, it is possible to choose pilot frequencies and intermodulation frequencies simultaneously lying in the pass band of the non-linear device. They can be chosen outside the useful band, that is to say the band actually used by the useful signal. It is possible to generate intermodulation products at low frequencies. Thus, the frequencies of the pilots F1 and F2 can be high but by choosing these pilot frequencies close to one another, the frequency of the intermodulation of order two which lies at F1–F2 can be relatively low, thus rendering the detectors simple to embody.

It is moreover desirable for the estimation of non-linearity to be performed at frequencies which are not too far from those corresponding to the actual intermodulation products, that is to say those due to the useful signal. The non-linearity is in fact dependent on the frequency and the coefficients $a_1$, $a_2$ ... of the transfer function linking the input voltage $v_i$ of the non-linear device to its output voltage $$vs = a_0 v_i + a_1 v_i + a_2 v_i^2 + \ldots$$

are complex coefficients.

Being able to choose two or more points in the pass band of the device makes it possible to obtain coefficients which are representative, on average, of the frequencies corresponding to the actual intermodulation products.

Finally, the levels of the components corresponding to a combination of the pilot frequencies may be higher and hence easier to measure than those corresponding to the harmonics, the amplitude ratio being 2 or 3 for 2nd or 3rd order components and for equal pilot amplitudes.

Figure 5:
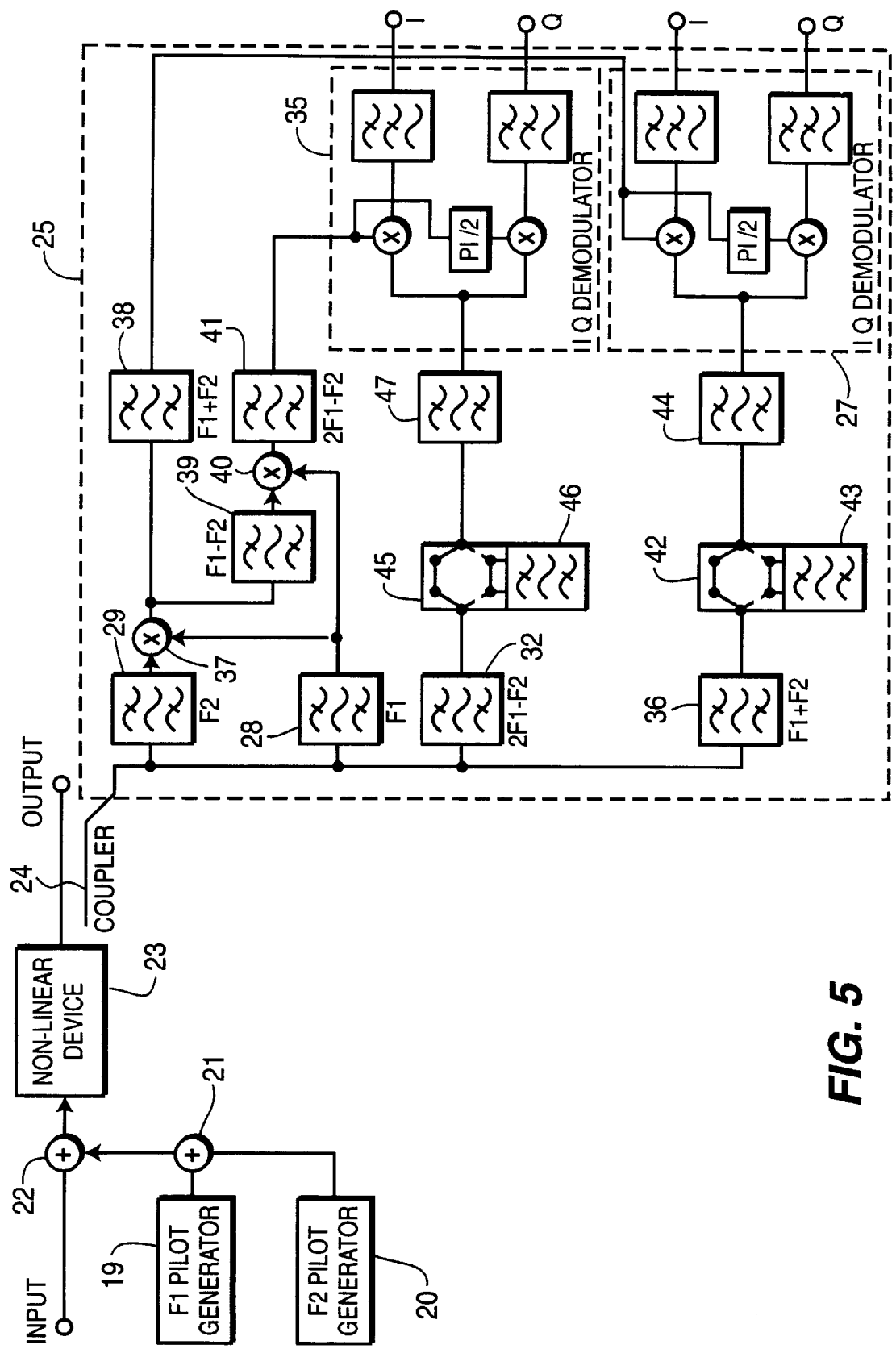
FIG. 5 represents a 1st example embodiment.

FIG. 5 is a first variant embodiment of the measurement device proper 25 previously described. The numbering of FIG. 4 is enlisted in respect of the elements in common which are not described again.

The input of the device 25 is linked in parallel to various circuits of which it is composed, namely to the inputs of the band-pass filters 28, 29, 32, and to the input of a band-pass filter 36 which is centred on the frequency F1+F2. It is therefore the component of order 2 at the frequency F1+F2 and the component of order 3 at the frequency 2×F1–F2 which will be measured.

The known non-linear element is here a threshold comparator associated with an "exclusive OR" logic circuit, the whole being represented in the figure by a multiplier 37 or 40, it being possible for the "exclusive OR" to be likened to a binary multiplier. The outputs of the filters 28 and 29 are respectively linked to a 1st input and to a 2nd input of the circuit 37 which carries out, by way of the threshold comparator, a "binarization" of each of these signals and then, by way of the "exclusive OR", a multiplication of these binary signals. The comparator may be likened to a harmonics generator and the multiplier to an intermodulation products generator. These numerous intermodulation products must therefore be filtered. To do this, the output of the multiplier is linked to a 1st filter 38 which selects the signal at the frequency F1+F2, later transmitted to the modulation input of the synchronous detection circuit 27, as well as to a 2nd filter 39 which selects the signal at the frequency F1–F2. The analog signal output by this filter 39 is sent to the input of a second multiplier 40 at the same time as the previous one, the 2nd input being supplied with the signal output by the filter 28. The intermodulation products generated at the output of the multiplier 40 therefore include the signal of frequency 2×F1–F2, which is selected by a band-pass filter 41 centred on this frequency. It is later transmitted to the modulation input of the synchronous detection circuit 35.

The quadrature detectors used generally produce signals on which continuous components are superimposed. Now, these latter may in certain cases falsify the measurement. This is why a switchable band-stop filter is used which, by eliminating the intermodulation, makes it possible to identify the shifts in the continuous components. It is then possible by calculation to correct the measurements (carried out without a band-stop filter) by subtracting the values of the continuous components measured when the band-stop filters were selected.

Thus, the 2nd order component at the frequency F1+F2 at the output of the filter 36 passes through a switch 42 which makes it possible to wire up or not in series a filter 43 which rejects the frequency F1+F2. The output of the switch is linked to the input of a band-pass filter 44 with central frequency F1+F2 placed as far as possible upstream so as to eliminate the interference signals picked up on the line. This filter is identical or even more selective than the filter 36. Its role is to filter the noise of the amplification system and of the intermodulation products intrinsic to the latter, this system not being represented in FIG. 5 but which is generally required behind the filters for selecting the intermodulation products. The output of the filter is linked to the signal input of the synchronous demodulation circuit 27.

Likewise for the 3rd order component at the frequency 2×F1–F2 output by the filter 32 which passes through a switch 45 making it possible to wire up or not in series a filter 46 which rejects this frequency 2×F1–F2. At the output of the switch, the signal passes through a band-pass filter 47 with the central frequency of 2×F1–F2 before driving the signal input of the synchronous Detection circuit 35. This filter 47 is, as indicated previously, a filter for limiting the noise spectrum.

This 1st variant which has just been described is used mainly for low frequencies. For example, in the embodiment effected:

F2=17 Mhz

F1=25.2 Mhz.

Thus, the use of standard selective band-pass filters and logic circuits as non-linear elements leads to a device which is simple to embody and inexpensive.

Figure 6:
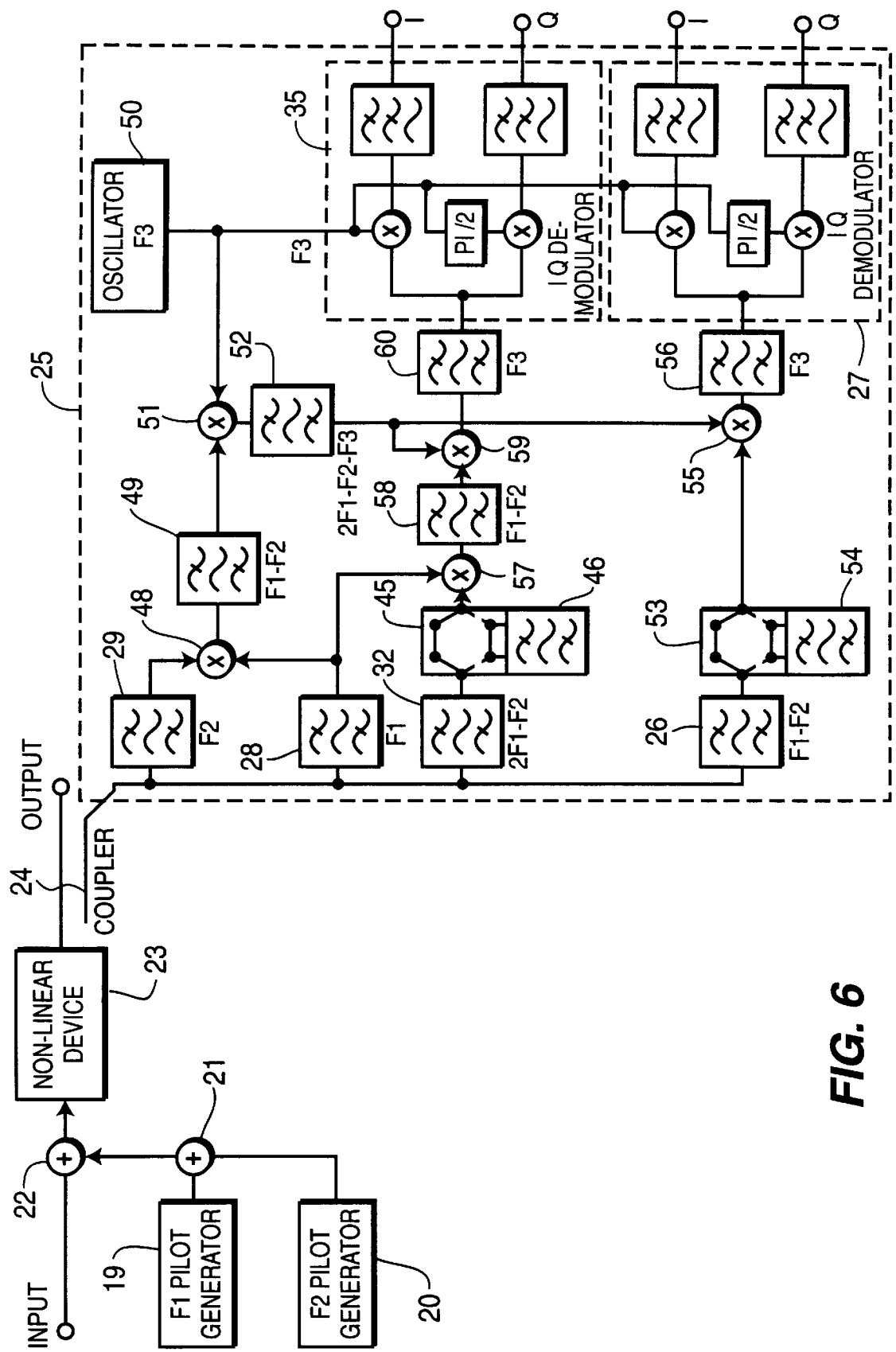
FIG. 6 represents a 2nd example embodiment.

The second variant embodiment is represented in FIG. 6. It is more suitable for high frequencies. For example for our embodiment:

F2=438 Mhz

F1=453 Mhz.

It uses a further frequency transposition which makes it possible to choose the frequency of operation of the synchronous demodulations. It is thus possible to use standard band-pass filters, hence of modest cost, offering high selectivity and very good protection in relation to the useful signal and noise. The synchronous detection circuits can operate at relatively low frequencies, despite the high frequencies F1 and F2 often imposed by the non-linear device. The known non-linear devices are here not logic circuits but analog multipliers, the operating frequencies being higher.

Unlike in the case of the previous device, the components of intermodulation products originating from a known non-linear device are harnessed not so as to modulate the synchronous detection circuits but to transpose the Intermodulation products to be measured to a single frequency F3, which frequency is chosen for the operation of the synchronous detection circuits.

The filters 28 and 29 make it possible to recover the two pilot frequencies F1 and F2 later transmitted to the two inputs of an analog multiplier 48. At its output, the band-pass filter 49 extracts the signal of frequency F1−F2 from the intermodulation products delivered by the multiplier.

An oscillator 50 delivers a signal at a frequency F3 which is the operating frequency chosen for the synchronous detection circuits. A multiplier 51 makes it possible to transpose the 2nd order component of frequency F1−F2 to the frequency F1−F2−F3. To do this, the output of the filter 49 is linked to a 1st input of the multiplier and the output of the oscillator 50 is linked to a 2nd input. The transposed signal is filtered on output by way of a band-pass filter 52 centred on F1−F2−F3.

The 2nd order component to be measured F1−F2 is filtered by the band-pass filter 26 and then passes through a switch 53 whose role is to allow the wiring up in series of a filter 54 which rejects the frequency F1−F2 for the reasons previously explained. It then supplies an analog multiplier 55 on an 1st input, the 2nd input receiving the signal F1−F2−F3 from the filter 52. A band-pass filter 56 centred on F3 is wired to the output of the multiplier and delivers the 2nd order component to be measured, transposed to the frequency F3, to the input of the synchronous detection circuit 27.

The 3rd order component to be measured 2×F1−F2 is filtered by the band-pass filter 32 and then passes through a switch 45 whose role is to allow the wiring up in series of a filter 46 which rejects the frequency 2×F1−F2 for the reasons previously explained. It then supplies an analog multiplier 57 on a 1st input, the 2nd input receiving the signal at the frequency F1 from the filter 28. A band-pass filter 58 centred on F1−F2 is wired to the output of the multiplier and selects the component 2×F1−F2 transposed to the frequency F1−F2. The output of the filter 58 is linked to the 1st input of an analog multiplier 59, the 2nd input being wired to the output of the filter 52. A band-pass filter 60 centred on F3 is wired to the output of the multiplier and delivers the 3rd order component to be measured, transposed to the frequency F3, to the input of the synchronous detection circuit 35, which is identical to the circuit 27.

The various transpositions are performed on the basis of known non-linear devices, the relations linking the signal at the input of a known non-linear device to the transposed output signal being therefore known. Thus, knowing the value of the signal 2×F1−F2 amounts to measuring the transposed signal F3.

In the two variants described, the dynamic range of the device is linked with the width of the preselection filter which allows through a noise power proportional to the width of its pass band. This noise can have a power 30 dB greater than the power of the sought-after intermodulation and can saturate the inputs of the quadrature detectors. Judicious choice of the frequencies of the pilots allows the use of quartz filters or standard ceramic filters, this reducing the cost of constructing the device. Thus, the filters F3 used in the device of FIG. 6 are quartz fitters of the type used in the intermediate frequency circuits of FM receivers, with central frequency 10.7 MHz and pass band of the order of 5 to 6 KHz.

The frequencies of the intermodulation products are chosen so as to use synchronous detection circuits operating at relatively low frequencies, as they are of relatively low cost, and giving better sensitivity. Thus, a difference of frequencies (F1−F2) rather than a sum (F1+F2) will rather be chosen if the values of F1 and F2 are high.

A particular application of the invention described above relates to a device for transmitting analog signals over optical fibre, for example in the context of the transmission of television channels. The diagram for incorporating the non-linearity correction and detection circuits which are the subjects of the invention is represented in FIG. 7.

It comprises a transmitting head consisting of a laser 61 associated with an external optical modulator 62. The latter includes an incorporated linearizing device which can be controlled through control voltages. These voltages are applied to the modulator 62 by way of a control device 63 which uses the measurements made by a non-linearity estimation device 64. The pilot frequencies are generated by a generator 65 so as to be transmitted to a first input of an adder 66. The second input of this adder receives the optical signal "useful" modulation signal. The output of the adder is linked to the modulation input of the optical modulator 62. Wired to the output of the modulator is an optical coupler 67 whose direct output is the harnessed modulated output and whose coupled output is linked to an optical receiver 68. This receiver translates the optical signal into an electrical signal, which signal is transmitted to the input of the measurement device 64. This measurement device is for example the device 25. The input signal is the modulated optical signal transformed into an electrical signal and therefore including the pilot frequencies. The output from this circuit is made up of pairs of signals I and Q, the number of which corresponds to that of the components measured by the device 64, which number depends for example on the inputs available on the non-linear device. Together, the circuits of the optical receiver 68, measurement device 64 and control device 63 represent the feedback control loop.

We claim:

1. Process for estimating non-linearity of a device (11, 23, 62) comprising steps of generating one or more pilot signals (10; 19, 20; 65) upstream of the device for measuring components of their intermodulation products at the output of the device, characterized in that the pilot signals pass through at least one known non-linear device (15; 30; 37, 40; 48) delivering intermodulation products of known characteristics, in that at least one of the components of the known intermodulation products is harnessed in order to modulate, with the aid of synchronous detection circuits (17; 27, 35), at least one signal relating to the components to be measured, and in that the pilot signals (10; 19, 20; 65) passing through the known non-linear device (15; 30; 37, 40; 48) are tapped off by filtering (14; 28, 29) the output signal from the device to be measured (11, 23).

2. Process for estimating non-linearity of a device (11, 23, 62) comprising steps of generating one or more pilot signals (10; 19, 20; 65) upstream of the device for measuring components of their intermodulation products at the output of the device, characterized in that the pilot signals pass through at least one known non-linear device (15; 30; 37, 40; 48) delivering intermodulation products of known characteristics, and in that at least one of the components of the known intermodulation products (F1–F2) is harnessed in order to transpose at least one of the components to be measured (F1–F2) to a specified frequency (F3) chosen as frequency of modulation of a transposed signal (F3), which modulation is effected by synchronous detection circuits (27, 35).

3. Process according to claim 1, characterized in that the component of the known intermodulation product which is harnessed (F1–F2, F1+F2, 2×F1–F2) has the same frequency as a signal relating to the component to be measured and directly modulates the synchronous detection circuit (27, 35).

4. Process according to claim 1, characterized in that a signal relating to a component to be measured is the component to be measured (2×F1–F2) transposed to a frequency of another component to be measured (F1–F2) with the aid of a $2^{nd}$ known non-linear device (33).

5. Process according to claim 2, characterized in that the harnessing (51) is a transposition of an intermodulation product (F1–F2) of the value corresponding to the specified frequency (F3).

6. Process according to claim 1, characterized in that the synchronous detection circuits (17; 27, 35) are circuits with two quadrature paths.

7. Process according to claim 1, characterized in that a known non-linear device comprises a threshold comparator followed by a binary multiplier (37, 40).

8. Process according to claim 1, characterized in that a filter (43, 46, 54) which rejects at a frequency of the signal to be measured by the synchronous detection circuit (27, 35) is wired to the input of the synchronous detection circuit (27, 35) so as to measure a continuous signal independent of the intermodulation component.

9. Estimator of non-linearity of a device (11, 23, 62) comprising a generator of pilot signals (10; 29, 20; 65), the pilot signals passing through the device, characterized in that it includes:
  a known non-linear device (15; 30; 37, 40; 48) receiving the pilot signals from the output of the device (11, 23, 62) so as to generate known intermodulation products at a frequency,
  a synchronous detection circuit (17; 27, 35) receiving one of the components of the intermodulation products of the device to be measured (11, 23, 72), a signal for modulation of the synchronous detection circuit being the component at the same frequency of the known intermodulation products.

10. Estimator of non-linearity of a device (11, 23, 62) comprising a generator of pilot signals (10; 29, 20; 65), the pilot signals passing through the device, characterized in that it includes:
  a synchronous detection circuit (17; 27, 35) operating at a specified modulation frequency (F3),
  at least one known non-linear device (55, 57, 59) coupled to the output of the device (11, 23, 62) for transposing a component of the intermodulation products to be measured to a frequency equal to that of the modulation signal (F3) of the synchronous detection circuit (17; 27, 35), the transposed signal being transmitted to the input of the synchronous detection circuit, relating to the pilot signals, and being of known characteristics.

11. Estimator of non-linearity according to claim 10 characterized in that the transposed signal is produced from a second known non-linear device (51) receiving the modulation signal (F3) of the synchronous detector (27, 35) and receiving a component of a known intermodulation product from a third known non-linear device (48) supplied with the pilot signals.

* * * * *